US008272005B2

(12) United States Patent
Yang et al.

(10) Patent No.: US 8,272,005 B2
(45) Date of Patent: Sep. 18, 2012

(54) INFORMATION MONITORING AND UPDATING METHOD AND SYSTEM FOR TRANSPORT STREAM

(75) Inventors: Chien-Yu Yang, Taipei County (TW); Cheng-Peng Kuan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 794 days.

(21) Appl. No.: 11/735,438

(22) Filed: Apr. 14, 2007

(65) Prior Publication Data

US 2008/0184325 A1 Jul. 31, 2008

(30) Foreign Application Priority Data

Jan. 30, 2007 (TW) ................................ 96103374 A

(51) Int. Cl.
*H04H 60/33* (2008.01)
*G06F 3/00* (2006.01)
*G06F 13/00* (2006.01)
*H04N 5/445* (2011.01)

(52) U.S. Cl. ............................................. 725/9; 725/44
(58) Field of Classification Search .................. None
See application file for complete search history.

(56) References Cited

U.S. PATENT DOCUMENTS

| | | | |
|---|---|---|---|
| 6,035,304 A * | 3/2000 | Machida et al. ........................ 1/1 |
| 6,351,474 B1 * | 2/2002 | Robinett et al. .............. 370/486 |
| 6,763,522 B1 * | 7/2004 | Kondo et al. .................... 725/39 |
| 6,877,017 B1 | 4/2005 | Beom |
| 6,966,065 B1 * | 11/2005 | Kitazato et al. ............... 725/116 |
| 6,970,564 B1 * | 11/2005 | Kubota et al. .................. 380/210 |
| 7,003,783 B2 | 2/2006 | Skaringer et al. |
| 7,086,076 B1 * | 8/2006 | Park ............................... 725/50 |
| 7,197,688 B2 * | 3/2007 | Lee ............................... 714/781 |
| 7,478,415 B1 * | 1/2009 | Takeuchi ........................ 725/42 |
| 7,647,619 B2 * | 1/2010 | Kashima ........................ 725/146 |
| 7,730,515 B1 * | 6/2010 | MacCormack et al. ...... 725/139 |
| 2002/0106018 A1 * | 8/2002 | D'Luna et al. ........... 375/240.01 |
| 2003/0007568 A1 * | 1/2003 | Hamery et al. .......... 375/240.26 |
| 2003/0101448 A1 * | 5/2003 | Kim ................................ 725/9 |
| 2006/0031871 A1 * | 2/2006 | Quere et al. .................... 725/25 |
| 2006/0048183 A1 * | 3/2006 | Choe .............................. 725/39 |
| 2006/0156369 A1 * | 7/2006 | Oishi ............................ 725/131 |
| 2008/0184325 A1 * | 7/2008 | Yang et al. .................... 725/132 |

* cited by examiner

*Primary Examiner* — Brian Pendleton
*Assistant Examiner* — Jonathan V Lewis
(74) *Attorney, Agent, or Firm* — Jianq Chyun IP Office

(57) ABSTRACT

An information monitoring and updating method and system for a transport stream is provided. First, a transport stream is received. The transport stream includes a program specific information (PSI) table, and the PSI table is divided into a plurality of sections. Next, by setting a first filtering parameter of a monitor-section filter, the header of each section of the PSI table is filtered out and is then checked whether to be a latest version or not. When all the section headers of the PSI table are of the latest version, each section of the PSI table is filtered by setting a second filtering parameter of a table-section filter.

13 Claims, 4 Drawing Sheets

INFORMATION MONITORING AND UPDATING METHOD AND SYSTEM FOR TRANSPORT STREAM

CROSS-REFERENCE TO RELATED APPLICATION

This application claims the priority benefit of Taiwan application serial no. 96103374, filed on Jan. 30, 2007. All disclosure of the Taiwan application is incorporated herein by reference.

BACKGROUND OF THE INVENTION

1. Field of the Invention

The present invention relates to a transport stream, more particularly to an information monitoring and updating method and system for a transport stream.

2. Description of Related Art

The development of digital TV industry brings along tremendous demands to multimedia home platform (MHP). Accordingly, various digital TV standard organizations have established their own middleware standards so that digital TV receivers conforming to these standards can perform diverse multimedia interactions, information applications, and services, such as electric program guide, real-time stock information, and TV shopping etc.

However, different countries or regions have different middleware standards for interactive digital TV, and which brings difficulties in program conversion between different middleware standards. Since the middleware standard established by Digital Video Broadcasting (DVB), the "Multimedia Home Platform (MHP)", has maturer technique compared to other middleware standards, the DVB has established a global digital TV middleware standard, the "Globally Executable MHP (GEM)" based on the MHP standard. However, the GEM standard is not a complete, independent standard; instead, it is a referenced framework for standards established based on MHP. Therefore, most new-generation interactive digital TV standards are established based on GEM, such as Open-Cable Application Platform (OCAP), Advance Common Application Platform (ACAP), and Association of Radio Industries and Businesses Application Engine (ARIB-AE).

To execute MHP services, service information (SI) and the data for executing service applications, namely, the digital storage media, command, and control (DSM-CC) data, are carried in a MPEG-2 transport stream. The DSM-CC comprises MHP application programs and data thereof, and these application programs and data are transmitted as object carousels. The information transmitted, for example, traffic information, stock information, etc, is updated constantly along with the service applications; therefore, to obtain real-time information and to execute the service applications instantly, a receiver has to monitor the information contained in a MPEG-2 transport stream constantly and updates the information when necessary.

As shown in FIG. 1, a MPEG-2 transport stream contains data packets of videos and audios of different programs, and a data packet can be located according to the packet identifier (PID) thereof. For example, the data packet with PID=82 corresponds to the audio sample 2 played by program 3. Program specific information (PSI) tables are defined for obtaining the information of a particular program in the MPEG-2 transport stream, and the PSI tables are respectively program association table (PAT) 101, program map tables (PMT) 102a and 102b, conditional access table, (CAT) 103, and network information table (NIT) 104 etc.

The PAT 101 (PID=0) records the PIDs of the PMTs of various programs in the MPEG-2 transport stream, for example, the PMT of program 3 is in the packet with PID=33. The PIDs of the videos and audios of various programs can be obtained from the PMTs 102a and 102b, for example, the PMT 102b records that the video sample 1 played by program 3 is in the packet with PID=19. The PID of the NIT 104 may also be obtained from the PAT 101 for identifying different transport streams.

According to the standard of "ISO-13818-1 Information technology-Generic Coding of Moving Picture and Associated Audio Information System", a section is defined as a syntactic structure. According to this standard, a PSI table can be divided into one or multiple sections, and each section can be placed into a plurality of packets of a MPEG-2 transport stream, wherein the PSI table contains information separated into sections, which includes SI and the data for executing service applications (DSMCC data). Required data can be obtained by only filtering the sections with section filters.

The information contained in the syntactic structure of a section includes table identification, table identification extension, version number, section number, and last section number etc. The table identification is used for identifying specific tables, and which is also used for identifying specific sub-tables along with the table identification extension. The section number and last section number respectively denote the number of a section and the number of sections for composing a sub-table. The version number is between 0 and 31, and which is increased every time when the version is updated, (it is started all over from 0 again when the version number exceeds 31). Accordingly, information monitoring of a MPEG-2 transport stream can be carried out by checking the version numbers of all the sections in a table (or a sub-table). When all the sections of the table (or the sub-table) have the latest version number, information updating can be performed to the MPEG-2 transport stream.

Generally speaking, in an information monitoring and updating method of a MPEG-2 transport stream, sections of a PSI table are obtained through a application program interface of a section filter defined by digital audio visual council (DAVIC), wherein there are three methods for filtering the sections. One of the methods is to filter only one section by using a simple-section filter. The second one is to provide a fixed memory position for storing sections by using a ring-section filter, wherein the maximum section numbers to be stored is preset so that multiple sections can be continuous filtered out in order. The last method is to obtain a complete table by using a table-section filter.

FIG. 2 is a block diagram illustrating a conventional information monitoring and updating method for a transport stream. Referring to FIG. 2, first, in step S201, whether or not an access to a table-section filter has been obtained is determined. When a user (the application program executing the table-section filter) has obtained the access to the table-section filter, a filtering parameter of the table-section filter, for example, table identification, table identification extension, version number, etc, is set in step S202 so as to filter out the sections of the particular table (or sub-table) in step S203. Next, in step S204, a version number contained in a captured section is compared to a version number previously stored in a memory in order to determine whether or not the version number of the captured section has been changed. If the version number of the captured section has been changed, in step S205, an event is issued to notify the user that a section of newer version is available, so that the user can determine whether to update the version of the information.

When the user determines to update the information to the latest version, a filtering parameter of the table-section filter is set to the newer version number in step S202, and the sections of the particular table are re-filtered in step S203 in order to obtain the sections of the latest version. Next, in step S204, the version numbers of the re-filtered sections are the same as the newer version number, so that step S206 is executed. In step S206, whether or not all the sections in the particular table are of the latest version is determined; if not all the section are of the latest version, step S203 is executed again to capture next section, otherwise, if all the sections are of the latest version, the information is updated and stored in step S207.

In the information monitoring method described above, the step of determining whether the version number of a section has been changed or not (step S204) can be performed by using only the version number contained in the header of the section, wherein the section header is usually an 8-byte space. Thus, as illustrated in FIG. 2, since the sections of the particular table are filtered out by the table-section filter and information monitoring is then carried out with the version numbers of these sections, information monitoring cannot be carried out effectively and memory space is also wasted. In addition, while performing information monitoring, the sections filtered by the table-section filter are discarded after they are used for determining whether the versions of the sections are of the latest version, and when the user decides to update the information, these sections of the particular table have to be re-filtered, which causes unnecessary section waste. Besides, while performing information updating, whether the captured section is of the latest version has to be checked again, so that data is moved repeatedly, and accordingly the system performance of the receiver platform is reduced.

A technique of "Method and device for providing downloaded object to an application" is disclosed in U.S. Pat. No. 7,003,783, wherein an application program interface is established for obtaining DSM-CC sections of the latest version in order to ensure that a user can always execute the application program of the latest version. However, this technique is only applicable to the DSM-CC portion of a transport stream but cannot provide other services, for example, service information (SI), of the latest version.

A technique of "Data transmission control method, data transmitting method, data transmitting apparatus, and receiving apparatus" is disclosed in U.S. Pat. No. 6,966,065, wherein whether or not the version of a DSM-CC section has been updated is determined through event transmission between a user and a server. However, this technique has a special specification and is not applicable to broadcasting telecommunication network, and besides, headend equipments compatible to the mechanism of this technique have to be used.

A technique of "Device and method for filtering added information" is provided by U.S. Pat. No. 6,877,017, wherein the device includes a memory, a comparison unit, and a section processing unit. The memory is used for storing table identification and the latest version number. The comparison unit is used for determining whether or not a section is conform to a filtering condition, namely, whether or not the table identification and the version number of the section are respectively the same as the table identification and the latest version number in the memory. The section processing unit is used for processing a section when the table identification and version number of the section are different from the table identification and the latest version number in the memory. This technique will be described in detail below.

FIG. 3 is a block diagram illustrating a method disclosed in U.S. Pat. No. 6,877,017 for filtering additional information. Referring to FIG. 3, first, in step S301, the beginning of a section is located in a MPEG-2 transport stream in order to obtain a section. Next, in step S302, whether or not the table identification of the section conforms to the table identification stored in the memory is determined. If so, steps S303 and S306 are executed; otherwise, if the table identification of the section does not conform to that recorded in the memory, step S304 is executed and the section is not processed. In step S306, whether or not the table to which the section belongs has been completed is determined. If so, the version number of the section is masked in step S307. In step S303, whether or not the version number of the section has been masked is determined. If so, step S304 is executed and the section is not processed. Otherwise, if the version number of the section is not masked, the section is processed in step S305.

However, in the technique described above, the user cannot choose a method for obtaining the section, and the user is not notified of resource changes and the state of sections. Besides, this technique provides information monitoring to MPEG-2 transport stream instead of MPEG-2 section, thus, application program interface conforming to DAVIC specification for filtering MPEG-2 section is not provided in this technique.

SUMMARY OF THE INVENTION

Accordingly, the present invention is directed to an information monitoring method and system for a transport stream, wherein information monitoring can be carried out by only filtering the header of a section in a PSI table. Accordingly, information monitoring can be completed quickly, memory space used for information monitoring calculation can be reduced, and the system performance of a receiver platform for carrying out information monitoring can be improved.

Examples of the present invention may provide an information updating method of a transport stream. According to this method, the header of a section in a PSI table is filtered out by using a monitor-section filter, and when the headers of all the sections in the PSI table are determined to be the latest version, a user is notified that a PSI table of newer version is available so that the user can determine whether to update the information. When the user decides to update the information, the sections of the newer version PSI table are filtered by a table-section filter and then the sections of the newer version PSI table are parsed, and stored, so that the information can be updated quickly, the system performance of the receiver platform can be improved, and the resources of the section filters can be used appropriately.

Examples of the present invention may provide an information monitoring method of a transport stream. First, a transport stream is received, wherein the transport stream includes at least one PSI table, and the PSI table is divided into a plurality of sections. Next, the header of each section of the PSI table is filtered out by setting a filtering parameter of a monitor-section filter, and information monitoring is then carried out with these section headers.

Examples of the present invention may provide an information updating method of a transport stream. First, a transport stream is received, wherein the transport stream includes at least one PSI table, and the PSI table is divided into a plurality of sections. Next, the header of each section in the PSI table is filtered out by setting a first filtering parameter of a monitor-section filter, and whether or not the header of each section is of the latest version is determined. When the headers of all the sections of the PSI table are of the latest version, each section of the PSI table is filtered by setting a second filtering parameter of a table-section filter.

In the present invention, the header of a section of the PSI table is filtered out by using a monitor-section filter, and information monitoring to the transport stream is carried out with this header, so that the memory space used for information monitoring calculation is reduced. Moreover, a new information monitoring and updating method is provided according to the information updating mechanism specified by DVB. According to this method, information monitoring and updating of a transport stream can be carried out quickly, the system performance of a receiver platform can be improved, and the resources of section filters can be utilized effectively.

Examples of the present invention may provide a system for monitoring information contained in a transport stream. The transport stream comprises at least one program specific information (PSI) table, and the PSI table is divided into a plurality of sections. The system comprises a section filtering module, an information monitoring module, and a notification mechanism. The section filtering module filters out a header of each section of a PSI table by setting a filtering parameter of a monitor-section filter. The information monitoring module compares a version number in the header of each section and a version number previously stored in a memory by using the header of each section of the PSI table. The notification mechanism receives a comparing result from the information monitoring module, if the PSI table is of the latest version when the headers of all the sections of the PSI table contain the latest version number, the notification mechanism notifies a user the PSI table is of the latest version.

The above-mentioned system further comprises an information updating module, for updating the filtering parameter of the monitor-section filter if the notification mechanism notifies the user the PSI table is of the latest version and a updating access right for updating is granted by the authority mechanism.

The above-mentioned system further comprises an authority mechanism, for checking an monitoring access right for monitoring information contained in the transport stream is granted, if the monitoring access right is not granted, the section filtering module is not permitted to filter out a header of each section of a PSI table.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
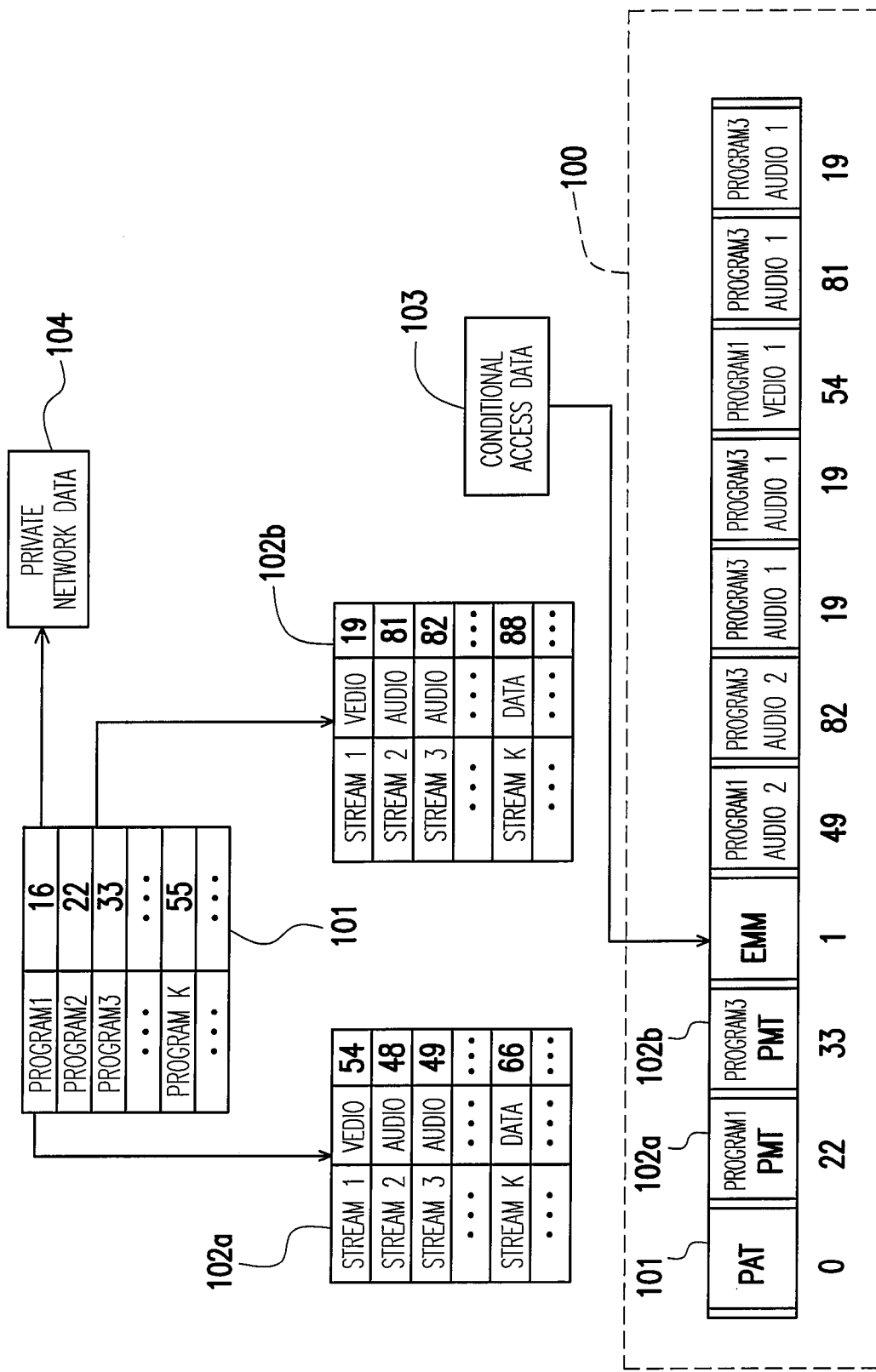
FIG. 1 is a schematic diagram of packets in a transport stream.
Figure 2:
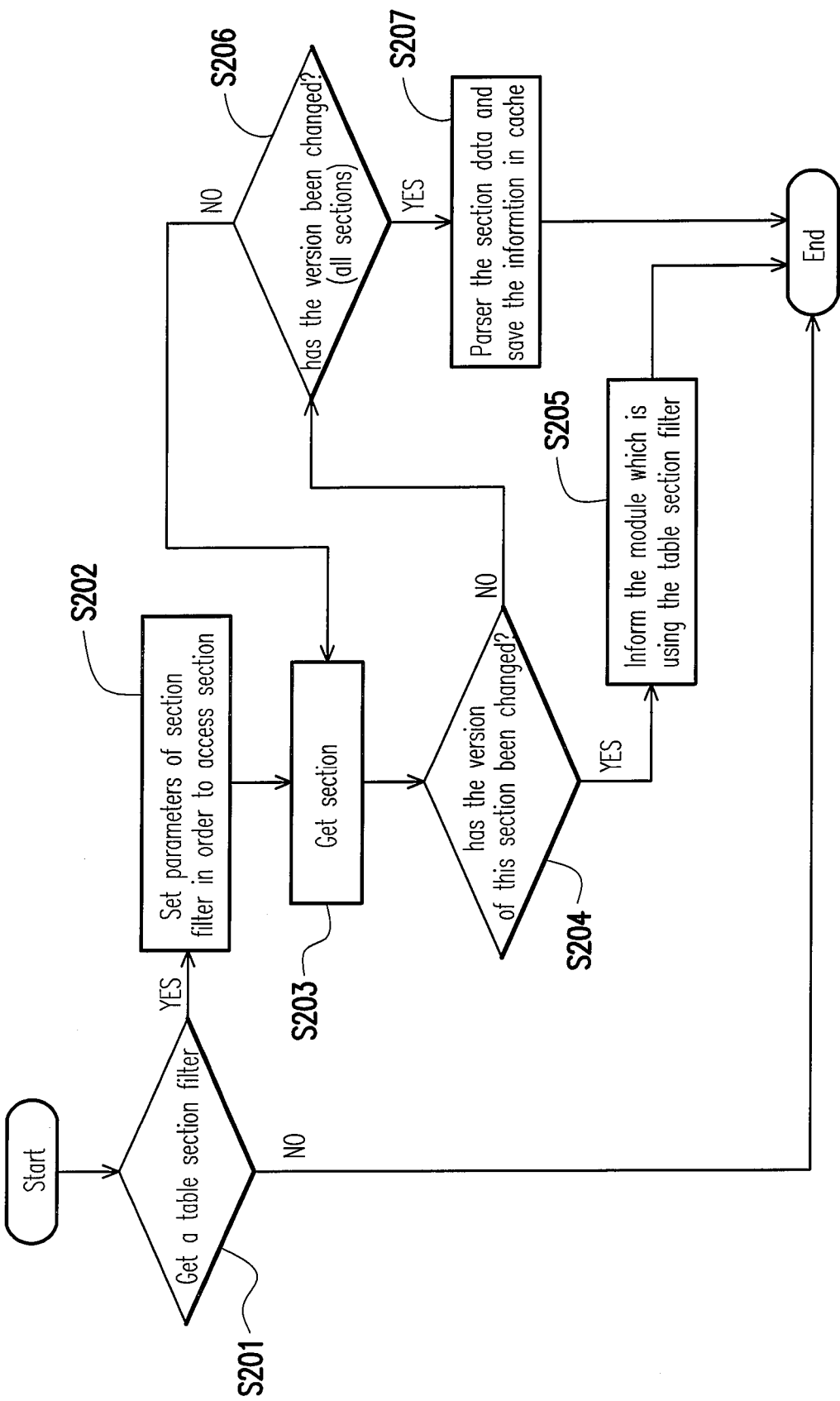
FIG. 2 is a block diagram illustrating a conventional information monitoring and updating method for a transport stream.
Figure 3:
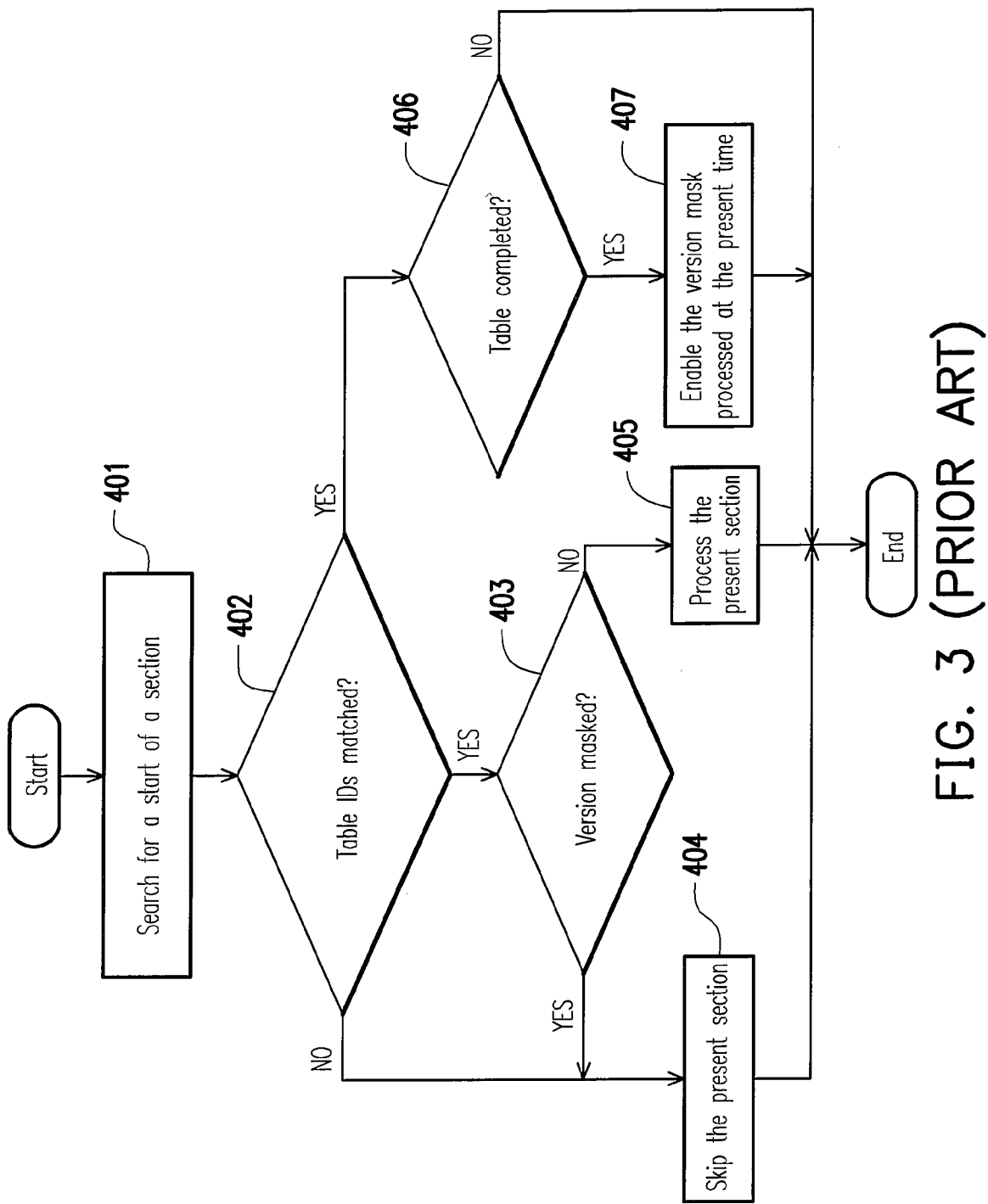
FIG. 3 is a block diagram illustrating a method disclosed in U.S. Pat. No. 6,877,017 for filtering additional information.

For the convenience of description, it is assumed that the present invention is applied to a digital TV receiver platform for monitoring and updating the information of a MPEG-2 transport stream. However, the present invention is not limited thereto; instead, the present invention may also be applied to other fields, such as a BD-J interactive CD player platform.

The present invention provides an information monitoring method of a transport stream. First, a transport stream is received, wherein the transport stream includes at least one program specific information (PSI) table, and the PSI table is divided into a plurality of sections. Next, the header of each section of the PSI table is filtered out by setting a filtering parameter of a monitor-section filter, and information monitoring is then carried out by using these section headers.

The present invention further provides an information updating method of a transport stream. First, a transport stream is received, wherein the transport stream includes at least one PSI table, and the PSI table is divided into a plurality of sections. Next, the header of each section of the PSI table is filtered out by setting a first filtering parameter of a monitor-section filter, and whether or not the header of each section is of the latest version is then determined. When the headers of all the sections of the PSI table are of the latest version, a second filtering parameter of a table-section filter is set for filtering each section of the PSI table.

According to an exemplary embodiment of the present invention, the information monitoring and updating method of a transport stream described above further includes a step of comparing a version number contained in the header of each section with a version number previously stored in a memory.

According to an exemplary embodiment of the present invention, the information monitoring and updating method of a transport stream described above further includes a step of issuing a NewTableAvailableEvent when the headers of all the sections of the PSI table are of the latest version to notify a user that the PSI table is of the latest version and allow the user to decide whether to update the information.

In an embodiment, the present invention provides a system for monitoring information contained in a transport stream. The transport stream comprises at least one program specific information (PSI) table, and the PSI table is divided into a plurality of sections. The system comprises a section filtering module, an information monitoring module, and a notification mechanism. The section filtering module filters out a header of each section of a PSI table by setting a filtering parameter of a monitor-section filter. The information monitoring module compares a version number in the header of each section and a version number previously stored in a memory by using the header of each section of the PSI table. The notification mechanism receives a comparing result from the information monitoring module, if the PSI table is of the latest version when the headers of all the sections of the PSI table contain the latest version number, the notification mechanism notifies a user the PSI table is of the latest version.

The above-mentioned system comprises an information updating module, for updating the filtering parameter of the monitor-section filter if the notification mechanism notifies the user the PSI table is of the latest version and a updating access right for updating is granted by the authority mechanism.

The above-mentioned system further comprises an authority mechanism, for checking an monitoring access right for monitoring information contained in the transport stream is granted, if the monitoring access right is not granted, the section filtering module is not permitted to filter out a header of each section of a PSI table.

Below, an embodiment of the present invention will be described in detail.

In the present embodiment, a new information monitoring and updating method for a transport stream is provided according to the section updating mechanism of MPEG-2 transport stream established by Digital Video Broadcasting (DVB). This method will not affect any existing standards and can be applied broadly. In the present embodiment, a monitor-section filter of new design is used for filtering out the section headers in order to perform information monitoring of the transport stream. The design of this monitor-section filter conforms to the specification of application program interface of a section filter defined by DAVIC. The function of the monitor-section filter will be described in detail below.

In the present embodiment, the header of a section of the particular table (or sub-table) is filtered out by setting a filtering parameter of the monitor-section filter, for example, table identification, table identification extension, etc, and information monitoring of the MPEG-2 transport stream is then carried out by using the version number contained in the section header. The length of a section header is usually 8 bytes, so that less memory space is used for storing the section header compared to conventional DAVIC section filter.

Figure 4:
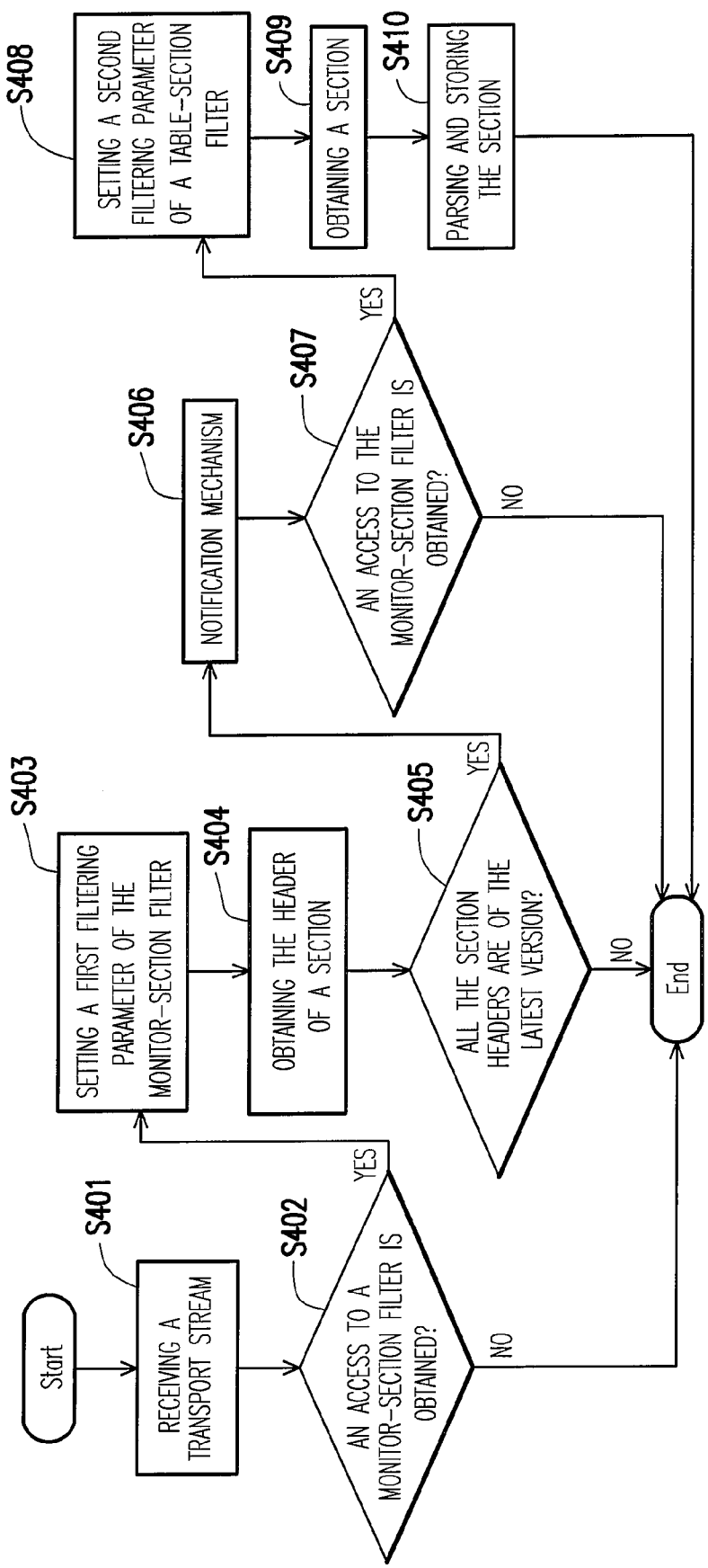
FIG. 4 is a flowchart illustrating an information monitoring and updating method for a transport stream according to an exemplary embodiment of the present invention.

The present embodiment includes two portions, one is to perform information monitoring of the transport stream, and the other portion is to perform information updating of the transport stream. FIG. 4 is a flowchart illustrating an information monitoring and updating method for a transport stream according to an exemplary embodiment of the present invention. Referring to FIG. 4, first, in step S401, a transport stream is received, wherein the transport stream includes at least one PSI table, and according to the syntactic structure of section defined by "ISO-13818-1:System" standard, the PSI table is divided into a plurality of sections. The PSI table contains information separated in sections, which includes SI and digital storage media, command, and control (DSM-CC) data.

In the present embodiment, a section filter is managed as sparse resources, namely, a user (application program executing monitor-section filter) has to register first to use the monitor-section filter, and the user can only use the monitor-section filter after the user gets permission. Thus, whether the user has obtained an access to the monitor-section filter is determined first in step S402, and after the access to the monitor-section filter is obtained, the header of a section in a particular PSI table (or sub-table) is filtered out in step S404 by setting a first filtering parameter of the monitor-section filter, for example, table identification, table identification extension, etc, in step S403, and the section head is then stored in the memory temporarily.

Next, in step S405, a version number in the obtained section header is compared with a version number previously stored in the memory. Initially, there is no version number stored in the memory, thus, the version number contained in the firstly obtained section header is stored temporarily in the memory. In addition, the section header and version number are only stored in the memory temporarily while performing information monitoring, and the space for storing the section header and version number is released once the information monitoring process is completed.

Next, During the process of comparing the version number in each section header with the version number in the memory, a NewTableAvailableEvent is issued (by the application program executing the monitor-section filter) in step S406 to notify the user about current information status and allow the user to decide whether to update the information of the transport stream when all the section headers in the particular PSI table are of the latest version.

When the user decides to perform information updating to the transport stream, whether or not an access to the table-section filter has been obtained is determined first in step S407 to manage the resources of the section filters effectively. If an access to the table-section filter has been obtained, the sections of the particular PSI table are filtered in step S409 by setting a second filtering parameter of the table-section filter, for example, table identification, table identification extension, version number, etc, in step S408, and the sections are then parsed and stored in step S410. In the present embodiment, since the sections of the particular PSI table are filtered by the table-section filter when all the section headers of the particular PSI table are determined to be of the latest version (i.e. the information monitoring process), the information updating method in the present embodiment has reduced number of moving data compared to conventional techniques.

In overview, in the present embodiment, a monitor-section filter is used for filtering out the header of a section of the PSI table, and a version number in the section header is used for determining whether a section of new version is available, thus, the memory space used for information monitoring calculation is reduced, and unnecessary section waste in conventional technique is also avoided. Besides, in the present embodiment, a notification mechanism is provided when all the section headers of the PSI table are of the latest version. In other words, an event is issued to notify the user about current information status and allow the user to decide whether to update the information. Moreover, in the present embodiment, when it is determined that all the section headers of the PSI table are of the latest version, the sections of the PSI table are filtered by a table-section filter, and then the sections of the PSI table are parsed, and stored, so as to complete information updating. As described above, the present invention has at least following advantages: information monitoring and updating is carried out quickly; the system performance of a receiver platform is improved, and hardware fabricating cost is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An information monitoring method for a transport stream, the method comprising:

receiving a transport stream comprising at least one program specific information (PSI) table, wherein information of the PSI table is separated into a plurality of sections, each one of the sections comprises at least a section header and each section header comprises a plurality of information elements, wherein one of the information elements is a version number;

setting a filtering parameter of a monitor-section filter configured for filtering out a section header of each one of the sections of the PSI table, wherein the filtering parameter is one of the information elements in the section header of each one of the sections, and the monitor-section filter just filters the section header of each one of the sections of the PSI table; and performing information monitoring by just using the section headers of all sections of the PSI table, wherein the information monitoring comprises comparing a version number in the section header of each one of the sections and a version number previously stored in a memory.

2. The information monitoring method as claimed in claim 1, wherein before the step of setting a filtering parameter of a monitor-section filter, the information monitoring method further comprises:

determining whether or not an access to the monitor-section filter is obtained.

3. The information monitoring method as claimed in claim 1 further comprising:

initially, storing the version number in a firstly obtained section header into the memory.

4. The information monitoring method as claimed in claim 1, wherein the step of performing information monitoring by just using the section header of all sections of the PSI table further comprises:

transmitting a NewTableAvailableEvent to notify a user that the PSI table is of the latest version when the section headers of all the sections of the PSI table contain the latest version number.

5. An information updating method for a transport stream, the method comprising:

receiving a transport stream comprising at least one PSI table, wherein information of the PSI table is separated into a plurality of sections, each one of the sections comprises at least a section header and each section header comprises a plurality of information elements, wherein one of the information element is a version number;

setting a first filtering parameter of a monitor-section filter, filtering out a section header of each one of the sections of the PSI table, wherein the filtering parameter is one of the information elements in the section header of each one of the sections and the monitor-section filter just filters the section header of each one of the sections of the PSI table;

determining whether or not the section headers of sections are of the latest version by comparing a version number in the section header of each one of the sections and a version number previously stored in a memory; and setting a second filtering parameter of a table-section filter and filtering all sections of the PSI table, when the section headers of all the sections of the PSI table are of the latest version, wherein the table-section filter filters all the sections of the PSI table.

6. The information updating method as claimed in claim 5, wherein before the step of setting a filtering parameter of a monitor-section filter, the information monitoring method further comprises:

determining whether or not an access to the monitor-section filter is obtained.

7. The information updating method as claimed in claim 5 further comprising:

determining whether or not an access to the table-section filter is obtained.

8. The information updating method as claimed in claim 5 further comprising:

initially, storing the version number in a firstly obtained section header into the memory.

9. The information updating method as claimed in claim 5 further comprising:

transmitting a NewTableAvailableEvent to notify a user that the PSI table is of the latest version and allow the user to determine whether to update the PSI table or not, when the section headers of all the sections of the PSI table are of the latest version.

10. A system for monitoring information contained in a transport stream, the transport stream comprising at least one program specific information (PSI) table, information of the PSI table being separated into a plurality of sections, each one of the sections comprising at least a section header, each section header comprising a plurality of information elements, and one of the information elements being a version number, the system comprising:

a section filtering module, for filtering out section headers of all sections of the PSI table by setting a filtering parameter of a monitor-section filter, wherein the filtering parameter is one of the information elements in the section header of each one of the sections and the monitor-section filter just filters the section header of each one of the sections of the PSI table; and an information monitoring module, for comparing a version number in the section header of each section and a version number previously stored in a memory by using just the section header of each section of the PSI table.

11. The system as claimed in claim 10, further comprising: a notification mechanism, for receiving a comparing result from the information monitoring module, if the PSI table is of the latest version when the section headers of all the sections of the PSI table contain the latest version number, the notification mechanism notifies a user the PSI table is of the latest version.

12. The system as claimed in claim 10, further comprising: an authority mechanism, for checking an monitoring access right for monitoring information contained in the transport stream is granted, if the monitoring access right is not granted, the section filtering module is not permitted to filter out the section header of each one of the sections of the PSI table.

13. The system as claimed in claim 12, further comprising: an information updating module, for updating the filtering parameter of the monitor-section filter if the notification mechanism notifies the user the PSI table is of the latest version and an updating access right for updating is granted by the authority mechanism.

* * * * *